(12) United States Patent
Sullivan (10) Patent No.: US 7,886,547 B2
(45) Date of Patent: Feb. 15, 2011

(54) MACHINES AND METHODS FOR REMOVING WATER FROM AIR

(76) Inventor: Shaun E. Sullivan, 5215 Springcrest Dr. South, Salem, OR (US) 97306

( * ) Notice: Subject to any disclaimer, the term of this patent is extended or adjusted under 35 U.S.C. 154(b) by 435 days.

(21) Appl. No.: 12/127,977

(22) Filed: May 28, 2008

(65) Prior Publication Data

US 2009/0293513 A1    Dec. 3, 2009

(51) Int. Cl.
F25D 17/06    (2006.01)
(52) U.S. Cl. ............................. 62/93; 62/291
(58) Field of Classification Search ............. 62/92, 62/93, 150, 272, 285, 291, 121, 304; 261/26, 261/28
See application file for complete search history.

(56) References Cited

U.S. PATENT DOCUMENTS

| | | |
|---|---|---|
| 1,816,592 A | 7/1931 | Achille |
| 2,996,897 A | 8/1961 | Grimes |
| 3,035,418 A | 5/1962 | Wright |
| 3,500,654 A | 3/1970 | Sholtes |
| 3,628,590 A | 12/1971 | Knebusch |
| 3,675,442 A | 7/1972 | Swanson |
| 4,135,370 A | 1/1979 | Hosoda |
| 4,255,937 A | 3/1981 | Ehrlich |
| 4,287,723 A * | 9/1981 | Dosmond ............ 62/238.6 |
| 4,291,542 A * | 9/1981 | Sminge et al. ............ 62/156 |
| 4,452,620 A * | 6/1984 | Dosmond ............ 62/238.6 |
| 4,554,968 A | 11/1985 | Haas |
| 4,628,706 A | 12/1986 | Neudorfer |
| 4,712,382 A | 12/1987 | LeClear |
| 4,759,195 A | 7/1988 | Biancardi |
| 5,065,584 A * | 11/1991 | Byczynski et al. ............ 62/81 |
| 5,106,512 A | 4/1992 | Reidy |
| 5,149,446 A | 9/1992 | Reidy |
| 5,203,989 A | 4/1993 | Reidy |
| 5,259,203 A | 11/1993 | Engel |
| 5,269,151 A | 12/1993 | Dinh |
| 5,275,008 A | 1/1994 | Song |
| 5,301,516 A | 4/1994 | Poindexter |
| 5,398,517 A | 3/1995 | Poindexter |
| 5,517,829 A | 5/1996 | Michael |
| 5,551,250 A | 9/1996 | Yingst |
| 5,553,459 A | 9/1996 | Harrison |
| 5,555,732 A | 9/1996 | Whiticar |
| 5,669,221 A | 9/1997 | LeBleu |
| 5,701,749 A | 12/1997 | Zakryk |
| 5,845,504 A | 12/1998 | LeBleu |
| 6,029,461 A | 2/2000 | Zakryk |
| 6,058,718 A | 5/2000 | Forsberg |
| 6,116,034 A | 9/2000 | Alexeev |
| 6,155,074 A * | 12/2000 | Jung et al. ............ 62/506 |
| 6,182,453 B1 | 2/2001 | Forsberg |
| 6,209,337 B1 | 4/2001 | Edwards |
| 6,230,503 B1 | 5/2001 | Spletzer |
| 6,237,352 B1 | 5/2001 | Goodchild |
| 6,289,689 B1 | 9/2001 | Zakryk |
| 6,343,479 B1 * | 2/2002 | Merritt ............ 62/285 |

(Continued)

FOREIGN PATENT DOCUMENTS

AU    2002368198    11/2002

(Continued)

*Primary Examiner*—Mohammad M Ali (57) ABSTRACT

The invention provides machines and methods for extracting water from atmospheric air. Also provided are bladed core heat exchangers.

39 Claims, 7 Drawing Sheets

U.S. PATENT DOCUMENTS

| | | |
|---|---|---|
| 6,415,618 B1 | 7/2002 | Sul |
| 6,453,684 B1 | 9/2002 | Spletzer |
| 6,481,232 B2 | 11/2002 | Faqih |
| 6,490,879 B1 | 12/2002 | Lloyd |
| 6,499,309 B1 | 12/2002 | Yeh |
| 6,505,477 B1 | 1/2003 | Smith |
| 6,574,979 B2 | 6/2003 | Faqih |
| 6,588,225 B1 | 7/2003 | Hodgson |
| 6,588,226 B1 | 7/2003 | Semrow |
| 6,644,060 B1 | 11/2003 | Dagan |
| 6,684,648 B2 * | 2/2004 | Faqih ............... 62/93 |
| 6,705,104 B2 | 3/2004 | Tani |
| 6,755,037 B2 * | 6/2004 | Engel et al. ............ 62/177 |
| 6,779,358 B2 | 8/2004 | Zakryk |
| 6,799,430 B2 | 10/2004 | Steiner |
| 6,828,499 B2 | 12/2004 | Max |
| 6,863,827 B2 | 3/2005 | Saraceno |
| 6,868,690 B2 | 3/2005 | Faqih |
| 6,945,063 B2 | 9/2005 | Max |
| 7,000,410 B2 | 2/2006 | Hutchinson |
| 7,004,246 B2 | 2/2006 | Gavula |
| 7,043,934 B2 | 5/2006 | Radermacher |
| 7,089,763 B2 | 8/2006 | Forsberg |
| 7,121,101 B2 | 10/2006 | Merritt |
| 7,272,947 B2 | 9/2007 | Anderson |
| 7,293,420 B2 | 11/2007 | Max |
| 7,306,654 B2 | 12/2007 | King |
| 2002/0011075 A1 | 1/2002 | Faqih |
| 2002/0023445 A1 | 2/2002 | Sul |
| 2002/0029580 A1 | 3/2002 | Faqih |
| 2002/0046569 A1 | 4/2002 | Faqih |
| 2002/0069653 A1 | 6/2002 | Goodchild |
| 2002/0189273 A1 | 12/2002 | Tani |
| 2003/0094011 A1 * | 5/2003 | Zakryk et al. ............ 62/291 |
| 2003/0154736 A1 | 8/2003 | Lloyd |
| 2003/0159457 A1 | 8/2003 | Faqih |
| 2003/0167779 A1 | 9/2003 | Steiner |
| 2004/0040322 A1 * | 3/2004 | Engel et al. ............ 62/177 |
| 2004/0244398 A1 | 12/2004 | Radermacher |
| 2005/0097901 A1 | 5/2005 | Hutchinson |
| 2005/0139552 A1 | 6/2005 | Forsberg |
| 2005/0262854 A1 | 12/2005 | Merritt |
| 2005/0284167 A1 | 12/2005 | Morgan |
| 2006/0005561 A1 | 1/2006 | Murphy |
| 2006/0053819 A1 | 3/2006 | Wu |
| 2006/0060218 A1 * | 3/2006 | Lakdawala et al. ......... 134/22.1 |
| 2006/0101838 A1 | 5/2006 | Ritchey |
| 2006/0288709 A1 * | 12/2006 | Reidy ............... 62/3.4 |
| 2007/0012060 A1 | 1/2007 | Simons |
| 2007/0039345 A1 | 2/2007 | Forsberg |
| 2007/0295021 A1 | 12/2007 | Tyls |
| 2008/0022694 A1 | 1/2008 | Anderson |
| 2008/0276630 A1 * | 11/2008 | Lukitobudi ............... 62/93 |

FOREIGN PATENT DOCUMENTS

| | | |
|---|---|---|
| AU | 2003100180 A4 | 7/2003 |
| AU | 2005293525 | 8/2005 |
| WO | 9739197 A1 | 10/1997 |
| WO | 9926030 A1 | 5/1999 |
| WO | 9943997 A1 | 9/1999 |
| WO | 9966136 A1 | 12/1999 |
| WO | 0014464 A1 | 3/2000 |
| WO | 0184066 A1 | 11/2001 |
| WO | 02100920 A1 | 12/2002 |
| WO | 03031026 A1 | 4/2003 |
| WO | 03104571 A1 | 12/2003 |
| WO | 2006017888 A1 | 2/2006 |
| WO | 2007009184 A1 | 1/2007 |
| WO | 2007068054 A1 | 6/2007 |
| WO | 2007098534 A1 | 9/2007 |
| WO | 9609443 A1 | 7/2008 |

* cited by examiner

Fig. 8

MACHINES AND METHODS FOR REMOVING WATER FROM AIR

FIELD OF THE INVENTION

The present invention relates generally to machines and methods for removing water from air. More specifically, the invention relates to machines and methods for removing water from an air flow to produce a supply of usable water.

BACKGROUND

Devices for extracting water from air are known. These devices may produce water for a variety of uses, such as human consumption. While existing devices are capable of producing water from air, they commonly have limitations. For example, existing devices may produce water at efficiency levels that are less than ideal. As a result, the per-gallon water production cost may be prohibitively expensive for many circumstances. The water production rates (e.g., gallons per day) may also be inadequate. Or the machine may be excessively large, not portable manually, unnecessarily complex, and/or terribly expensive.

It would be desirable to provide machines and methods that can be used for improving and/or expanding the capabilities and practical applications for removing water from air. Additionally or alternatively, it would be desirable to provide machines and methods that efficiently produce usable water, are portable (e.g., manually), and/or can remove water from air at substantial rates. To be practical for a wide variety of circumstances, the machine and process should produce water at low cost.

SUMMARY OF THE INVENTION

In certain embodiments, the invention provides a machine for removing water from an airflow. The machine comprises a path of air flow extending from an air intake to an air outlet. Preferably, the machine is configured such that air flowing along the path passes in sequence across a first evaporator, then across a first condenser, (optionally then across a second condenser), and then across a second evaporator. The first evaporator is located closer to the air intake than is the second evaporator. The machine is adapted to maintain the first evaporator at a desired temperature at or below a dew point of air flowing across the first evaporator. This desired temperature is above a freezing point of water contained in the air flowing across the first evaporator. The first condenser is adapted to heat air flowing away from the first evaporator. The machine is adapted to maintain the second evaporator at a temperature at or below a freezing point of water in air flowing across the second evaporator. The first evaporator is adapted to remove a first amount of water from the air flow by condensing liquid water, which is then delivered away from the first evaporator. The second evaporator is adapted to remove a second amount of water from the air flow by capturing ice on the second evaporator. The machine is adapted to subsequently melt the ice such that liquid water is then delivered away from the second evaporator.

Some embodiments of the invention provide a method for extracting water from air. The method involves using a machine through which a path of air flow extends. Air flowing along the path moves in sequence across a first evaporator, then across a first condenser (optionally then across a second condenser), and then across a second evaporator. The method comprises cooling air flowing across the first evaporator to a desired temperature at or below a dew point of the air flowing across the first evaporator to condense liquid water on the first evaporator, heating air flowing across the first condenser, and cooling air flowing across the second evaporator to a temperature at or below a freezing point of water in the air flowing across the second evaporator to form ice on the second evaporator. The ice is then melted to deliver liquid water away from the second evaporator.

In some embodiments, the invention provides a machine for removing water from an airflow. In the present embodiments, the machine comprises a path of air flow extending along a single axis of the machine from an air intake to an air outlet. The machine in these embodiments is configured such that air flowing along the path passes in sequence across a first evaporator, then across a first condenser, then across a second condenser, and then across a second evaporator. The first evaporator is located closer to the air intake than is the second evaporator. The machine is adapted to maintain the first evaporator at a desired temperature at or below a dew point of air flowing across the first evaporator. The desired temperature here is above a freezing point of water contained in the air flowing across the first evaporator. The first and second condensers are adapted to heat air flowing away from the first evaporator. The machine is adapted to maintain the second evaporator at a temperature at or below a freezing point of water in air flowing across the second evaporator. The first evaporator is adapted to remove a first amount of water from the air flow by condensing liquid water which is then delivered away from the first evaporator. The second evaporator is adapted to remove a second amount of water from the air flow by capturing ice on the second evaporator. The machine is adapted to subsequently melt the ice such that liquid water is then delivered away from the second evaporator, the machine being devoid of any water filter.

DETAILED DESCRIPTION OF THE PREFERRED EMBODIMENTS

The following detailed description should be read with reference to the drawings, in which like elements in different drawings are numbered identically. It will be understood that embodiments shown in the drawings and described herein are merely for illustrative purposes and are not intended to limit the invention to any embodiment. On the contrary, it is intended to cover all alternatives, modifications, and equivalents as may be included within the scope of the invention defined by the appended claims.

Figure 1:
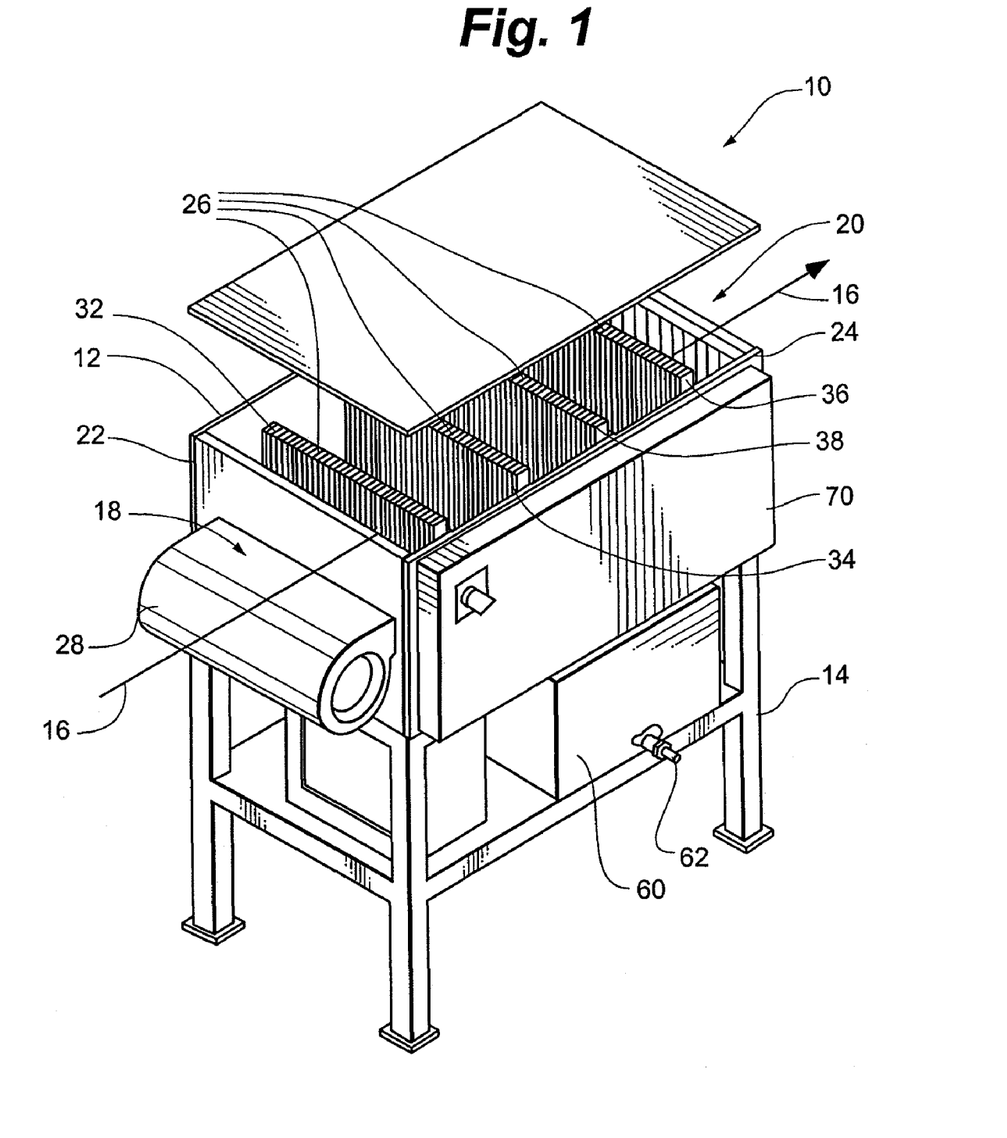
FIG. 1 is perspective view of a machine for removing water from an air flow in accordance with certain embodiments of the invention.

FIG. 1 illustrates a perspective view of a machine 10 for removing water from an air flow according to certain embodiments of the invention. The illustrated machine 10 comprises a housing 12 coupled to a frame 14, which is adapted to support the housing 12 upon a base, such as the ground, a floor of a building, a driveway, etc. The housing 12 can be configured in many different fashions, and the frame 14 may be omitted in some embodiments. The machine 10 has at least one path of air flow 16. In the embodiment of FIG. 1, the housing 12 provides (e.g., bounds or defines) a path of air flow 16 extending from an air intake 18 to an air outlet 20. In FIG. 1, the housing 12 is generally configured as a rectangular structure, with the air intake 18 provided at a first end 22 and the air outlet 20 provided at an opposing second end 24. The housing, however, is by no means required to be rectangular. The illustrated path of air flow 16 extends along an axis of the housing between the air intake and the air outlet. Thus, in the embodiments illustrated, the entire air flow path is generally parallel to a single axis. The illustrated air flow path is a generally horizontal path having no substantial changes in direction (e.g., the path does not have any 90° turns). Many other configurations, however, can be used for the housing, for the path of air flow, and for the air intake and outlet; FIG. 1 merely illustrates one possible embodiment.

Figure 2:
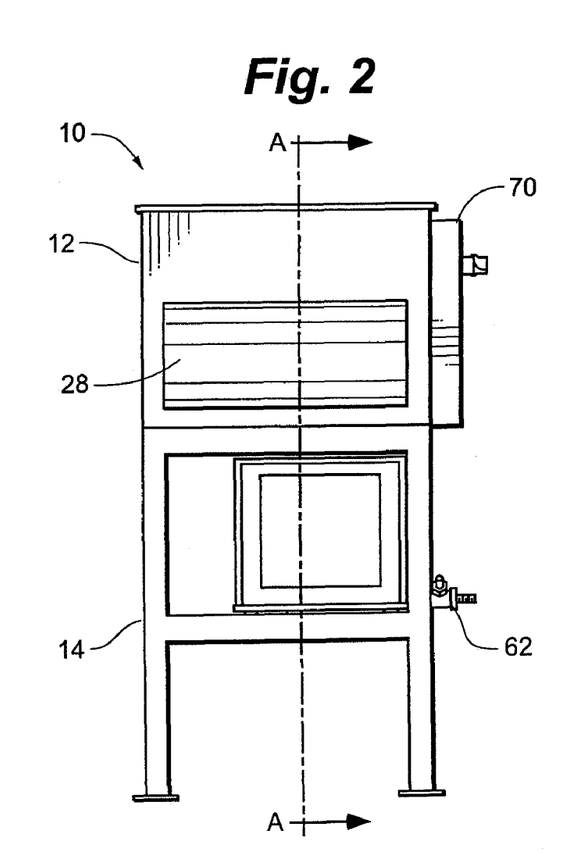
FIG. 2 is an end schematic view of the machine of FIG. 1.
Figure 3:
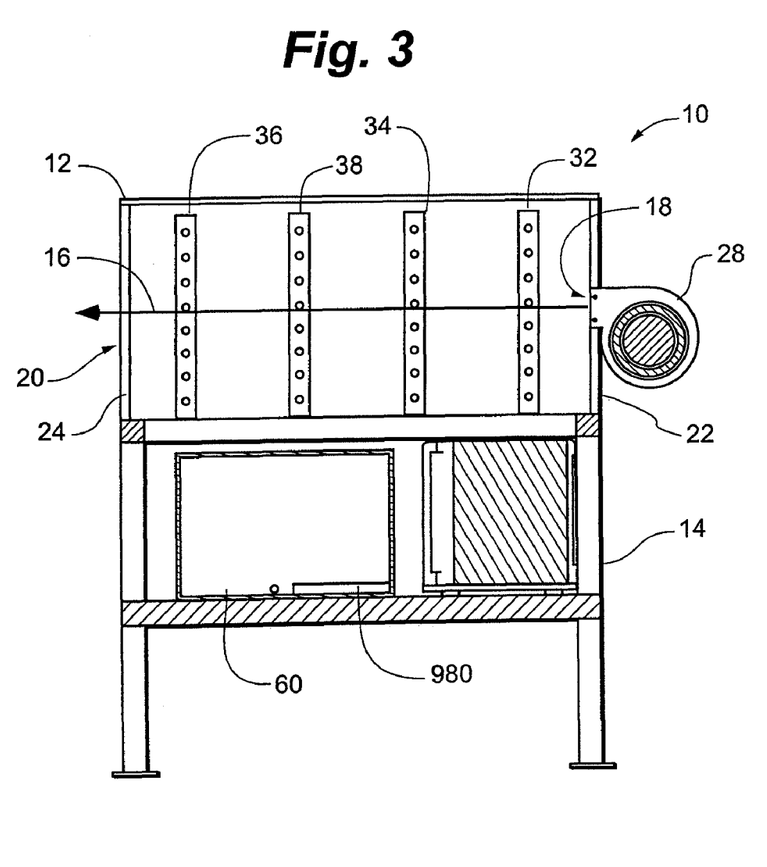
FIG. 3 is a side cross-sectional schematic view of the machine of FIG. 1

The machine 10 comprises a plurality of heat exchangers 26 positioned along the path of air flow 16. FIG. 3 shows a schematic side cross-sectional view of the machine 10 taken along line AA of FIG. 2. As illustrated, air enters the machine 10 at the air intake 18, which is at a first end of the housing 12. In some cases, a fan 28 (e.g., blower) adjacent to the air intake 18 moves (e.g., pushes or blows) air into the housing, causing the air to flow along path 16 towards the air outlet 20. In other cases, a fan is provided adjacent to the air outlet 20 so as to draw air through the machine (i.e., towards the air outlet/away from the air intake). If desired, fans/blowers can be provided both at the inlet and at the outlet.

The machine 10 illustrated in FIG. 3 comprises a number of heat exchangers, including a first evaporator 32, first condenser 34, and second evaporator 36, provided in that order along the path of air flow 16. The machine 10 is configured such that air flowing along the path 16 passes in sequence across the first evaporator 32, then across the first condenser 34, and then across the second evaporator 36 before reaching the air outlet 20. Preferably, the first evaporator 32, the first condenser 34, and the second evaporator 36 are adapted for simultaneous operation. In the embodiment illustrated, the first evaporator 32 is located closer to the air intake 18 than is the second evaporator 36. In some preferred embodiments, a second condenser 38 is provided between the first condenser 34 and the second evaporator 36. While other condensers and/or evaporators may be provided at various locations along the air flow path 16, it is preferable that air flowing from the first evaporator 32, across the first condenser 34, and to the second evaporator 36 does not flow across any other evaporator before reaching the second evaporator 36. In some embodiments of this nature, air flowing along this portion of the path 16 travels in a generally constant direction (e.g., generally parallel to a single axis of the machine, optionally a horizontal axis), e.g., without taking any 90° turns.

With continued reference to the embodiment of FIG. 3, the first evaporator 32 preferably is maintained at a desired temperature at or below the dew point of the air flowing across the first evaporator 32. Preferably, the first evaporator is at least two degrees Fahrenheit below the dew point, and perhaps more preferably at least five degrees below the dew point (e.g., about 5-8° F. below the dew point). By setting the temperature of the first evaporator significantly below the dew point, the present machines and methods can be designed to have water fall quickly from the air. The first evaporator 32 can thus be adapted to remove a first amount of water from the air flow by condensing liquid water, which is then delivered away from the first evaporator 32. As air flows across the first evaporator, the temperature of the air is lowered below its dew point. This causes water condensate to form on the first evaporator 32. As the resulting liquid water drips off the first evaporator 32, a bleed tray or another collection device DT (see FIG. 7) collects that water and flows it away from the first evaporator. Preferably, the desired temperature of the first evaporator 32 is above the freezing point of the water in the air flowing across the first evaporator, although this is not strictly required in all embodiments.

The second evaporator 36 preferably is maintained at a temperature at or below the freezing point of the water in the air flowing across the second evaporator 36. Preferably, the second evaporator is at least two degrees Fahrenheit below the freezing point of water, and perhaps more preferably at least five degrees below the freezing point (e.g., about 5-8° F. below the freezing point). The second evaporator 36 can thus be adapted to remove a second amount of water from the air flow by capturing ice on the second evaporator 36. After a desired amount of ice has formed on the second evaporator, the ice is melted such that liquid water flows away from the second evaporator 36. The water from this melted ice may be combined (optionally via a single bleed tray or other collection device DT, from which the collected water may then flow into one or more storage reservoirs 60) with the water produced by the first evaporator 32. However, it is not required that the water from the first evaporator be combined with the water from the second evaporator.

With continued reference to FIG. 3, the first condenser 34 is adapted to heat air flowing along the path 16 after it has passed the first evaporator 32. Heating the air after it flows across the first evaporator 32 can advantageously increase the machine's capability to further extract water from the air flow. This heating can raise the dew point of the air, making it easier to extract additional water. As air flows across the first evaporator 32, the temperature of the air is lowered to, or below, the dew point of the air (to condense liquid water from the air). Due to the air's loss of water during this condensation process, the relative humidity of the air decreases when it flows across the first evaporator. Since the temperature of the air decreases and the relative humidity is reduced, the dew point of the air flow is lowered when it flows across the first evaporator 32, making it difficult to subsequently extract more water from the air. As a result, the present invention involves heating the air before it reaches the second evaporator (so as to expand the air and raise its dew point, thus making subsequent water extraction easier). The temperature of the first condenser can be varied to accommodate the needs of different situations. In some embodiments, it is at least 20 degrees Fahrenheit higher than the temperature of ambient air outside the machine, and perhaps more preferably at least 25 degrees higher (e.g., about 30-35° F. higher). In some embodiments, air flowing away from the first condenser 34 subsequently flows across an optional second condenser 38. When provided, the second condenser 38 further heats the air flow, thereby further expanding the air and increasing its dew point. With such an increased dew point, the second evaporator 36 can more easily reduce the air temperature below the dew point so as to condense more water, which can advantageously be frozen by maintaining the second evaporator at or below the freezing point of the water in the air flowing across the second evaporator. When provided, the second condenser can optionally be maintained at a temperature that is higher than the ambient air temperature by any of the differentials noted above in this paragraph in connection with the first condenser.

In certain embodiments, the machine includes a second condenser 38 and it is maintained at a higher temperature than the first condenser 34. This, however, is by no means required. For example, some preferred embodiments involve both condensers being maintained at substantially the same temperature.

One particular embodiment will now be described. Here, the machine is hypothetically considered to operate in an environment where the ambient air is at a temperature of 79° F. with a relative humidity of 63% and a dew point of 40° F. The first evaporator 32 could be maintained at about 35° F. (with the pressure inside the evaporator being about 64 psi), and the second evaporator 36 could be maintained at about 16-22° F. (with the pressure inside the evaporator being about 50 psi). For purposes of discussion (and without precise accuracy on the numbers mentioned), after the air flow has passed the first evaporator 32, the relative humidity of the air may be around 28% and the air temperature may be around 45-50° F., with a dew point around 20° F. It would be difficult to remove additional water from such air without warming it back up; it is easier to extract water from warm expanded air, and warm expanded air can hold more water. Therefore, the present invention provides at least one condenser (or any other air heating device/system) adapted to heat the air flow before it reaches the second evaporator 36. Preferably, two condensers 34, 38 are located between the two evaporators 32, 36. In the foregoing hypothetical, after the air has passed both condensers 34, 38, it may be at a temperature around 80° F. with a relative humidity around 38% and a dew point of about 20-24° F. In the foregoing hypothetical, for example, the first condenser 34 could be maintained at about 108-111° F., and the second condenser 38 could also be maintained at about 108-111° F. It is to be appreciated that the temperatures noted herein for the condensers and evaporators refer to the temperature of the outside surface (e.g., the skin temperature) of the condenser or evaporator. For example, the skin temperature of each condenser may be about 108-111° F. when the temperature of gas inside the evaporator may be on the order of 200° F. The foregoing hypothetical example, however, is provided only for purposes of discussion. The noted parameters are by no means limiting to the invention.

The foregoing example is representative of embodiments wherein the temperature of the air flow is increased by at least 10 degrees, preferably by at least 15 degrees, and perhaps more preferably by at least 20 degrees (e.g., by 20-40° F.) in the time/distance it takes for the air to travel between the first evaporator and the second evaporator. While these parameters are not required in all embodiments, they are believed to give good results (at least for certain applications).

Embodiments of the invention can be adapted to extract substantial quantities of water from air flowing through the machine 10. In the illustrated embodiments, the first evaporator 32 is adjacent to the air intake 18. Preferably, it extracts a larger quantity of water from the air flow than does the second evaporator 36. As such, the first amount of water (condensed by the first evaporator 32) preferably is greater than the second amount of water (captured as ice and melted at the second evaporator 36). This, however, need not always be the case. In some embodiments, the first amount of water constitutes a major portion (i.e., 50% or more) of the water extracted from the air flow by the machine/process. In fact, the first amount of water may constitute more than about 70% of the total amount of water extracted from the air flow by the machine/process. In such embodiments, the second amount of water may constitute about 10-30%, preferably about 20-30%, of the total amount of water extracted from the air flow by the machine/process. These examples, however, are by no means limiting to the invention.

Figure 4:
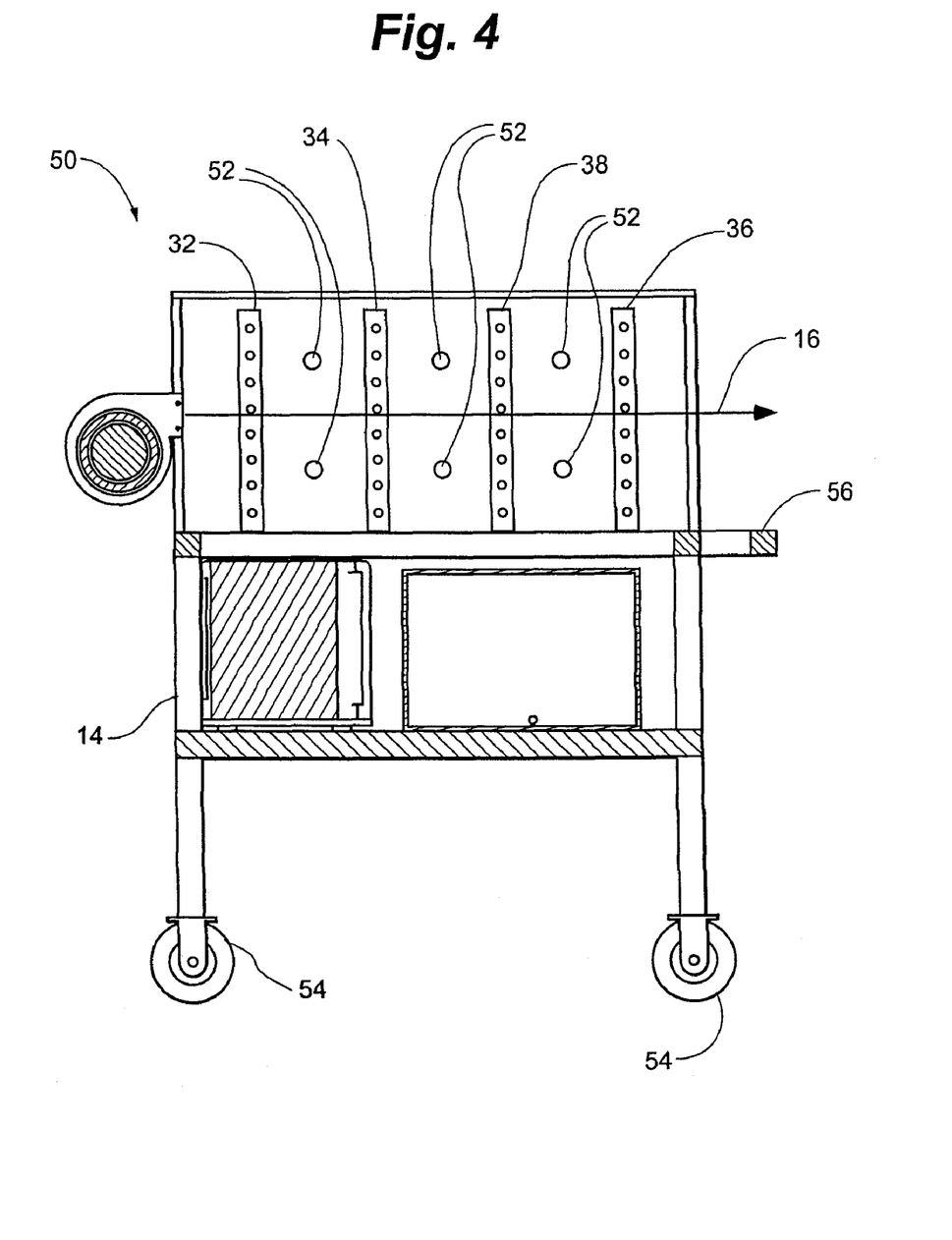
FIG. 4 is side cross-sectional schematic view of a portable machine for removing water from an air flow in accordance with certain embodiments.

Referring now to FIG. 4, there is shown a side cross-sectional schematic view of another machine 50 for removing water from an air flow in accordance with certain embodiments of the invention. Here, the machine 50 is configured to increase the relative humidity of air flowing through the machine, e.g., as such air flows away from the first evaporator 32 (i.e., after the first amount of liquid water has been condensed from the air flow by the first evaporator). This particular machine 50 is configured to combine additional air from outside the machine 50 with air already flowing along the path 16 inside the machine. Preferably, the additional air (or at least some of the additional air) enters the machine at a location or locations between the first evaporator 32 and the second evaporator 36 (e.g., before the combined air flows across the second evaporator 36). In some cases, the additional air (or at least some of the additional air) is combined with air flowing away from the first condenser 34 (e.g., at a location or locations between the first condenser and the second evaporator 36), although this is not required. In embodiments where the machine 50 comprises a second condenser 38, the additional air (or at least some of it) can optionally be combined with air flowing between the first condenser 34 and the second condenser 38, and/or it may be combined with air flowing between the second condenser 38 and the second evaporator 36.

In certain preferred embodiments, the machine includes first 34 and second 38 condensers that are spaced apart, and preferably are positioned at least a certain distance away from each other. This is advantageous in assuring that air flowing from the first evaporator to the second evaporator is adequately heated/expanded. In some cases, the distance between the first and second condensers 34, 38 is greater than the distance between the first evaporator 32 and the first condenser 34 and/or greater than the distance between the second condenser 38 and the second evaporator 36. In certain exemplary embodiments, the minimum distance between the two condensers 34, 38 is at least 12 inches, at least 18 inches, or at least 20 inches (e.g., 20-24 inches). The optimum distance, however, will vary depending on several factors, such as the air flow volume through the machine (e.g., with higher air flow volumes the optimum distance may be greater).

Referring to FIG. 4, the machine 50 can optionally have (e.g., define) one or more draft holes (or "inlets") 52 for allowing additional air from outside the machine 50 to combine with air already flowing through the machine. The draft holes 52 (or any other inlet suitable for admitting additional air) may be situated before, between, and/or after the first and second condensers. In some embodiments, the machine 50 is configured to selectively open and close one or more draft holes 52 or other inlets. For example, the machine 50 may comprise a flapper valve adjacent each draft hole 52 to close the draft hole or selectively open it. In general, any regulated orifice(s) can be used.

With continued reference to FIG. 4, it can be seen that the machine 50 can advantageously be configured to be portable (e.g., manually). For example, wheels 54 may be coupled with the frame 14, housing 12, or other parts of the machine to allow it to roll. In addition, a handle 56 can optionally be coupled to the frame or housing to facilitate easy movement of the machine. In some embodiments, a battery or fuel cell is provided to power the machine 50 during periods when the machine is remote from a stationary power source.

In certain embodiments, the air flow path 16 is equipped only with three or four heat exchangers (e.g., two evaporators and two condensers, or two evaporators and one condenser). These embodiments can provide efficient water production in a portable machine.

In some embodiments, the machine does not have (i.e., is devoid of) a water filtration system. The complexities and costs associated with such a system are therefore eliminated completely. This, however, is by no means required in all embodiments.

Referring back to FIG. 1, the machine 10 can optionally be provided with a reservoir 60 or another system for storing water. The bottom of a bleed tray (or other collection device) can optionally have one or more outlets from which conduit (e.g., plastic tubing) can deliver the collected water to the reservoir(s) 60. The reservoir can be any container suitable for storing clean, usable water. An optional spigot 62 can provide controlled access to water stored in the reservoir 60.

The machine may include one or more air filters to remove particulate matter from air flowing into the machine. Conventional air filters can be used, for example, to filter the air so as to remove particles down to 3 microns, or even down to 0.3 microns. When provided, the air filter may be followed by an optional static charge grid. Referring to FIG. 3, the reservoir 60 may comprise the UV treatment system 980. However, the machine can optionally have UV treatment devices at one or more other locations.

In any embodiment of the invention, extracted water may optionally be treated (e.g., by UV treatment) to remove bacteria. For example, ultraviolet radiation may be used to treat water stored in the reservoir 60. Thus, the machine in any embodiment of the invention can optionally include a device for treating with UV radiation at least some of the water the machine removes from the air.

According to certain preferred embodiments, the machine 10 includes one or more vapor-compression loops for controlling the temperatures of the machine's evaporators and condenser(s). For example, FIG. 1 illustrates an embodiment wherein the machine has a side housing 70 adapted to enclose portions of two vapor-compression loops, which include the evaporators and condensers of the illustrated machine 10.

Figure 5:
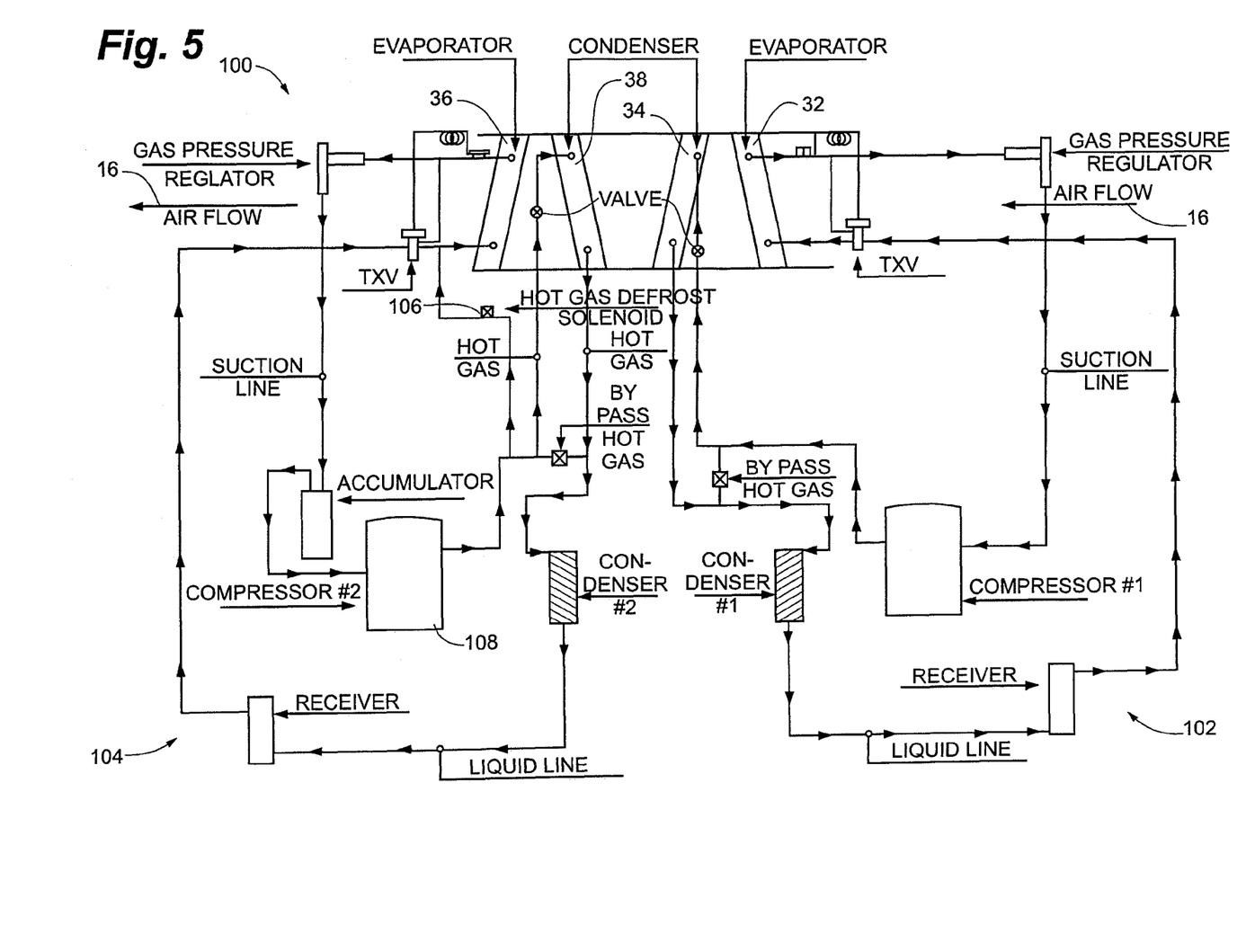
FIG. 5 is a schematic flow diagram illustrating a vapor-compression system for removing water from an air flow in accordance with certain embodiments of the invention.

Referring now to FIG. 5, an exemplary vapor-compression system 100 is illustrated according to certain embodiments of the invention. As seen towards the top of the schematic, the machine's air flow path 16 involves air flowing sequentially across the first evaporator 32, the first condenser 34, the second condenser 38, and the second evaporator 36. Here, the vapor-compression system 100 comprises a first loop 102, which controls the temperatures of the first evaporator 32 and the first condenser 34, and a second loop 104, which controls the temperatures of the second evaporator 36 and the second condenser 38. While the illustrated loops 102, 104 are separate sub-systems, the loops can alternatively be integrated (e.g., so as to share a common compressor).

The illustrated vapor-compression loops 102, 104 operate according to standard refrigeration principles familiar to those skilled in the art. Briefly, the loops 102, 104 each comprise a compressor in addition to an evaporator 32, 36 and a condenser 34, 38. Thermoexpansion valves and gas pressure regulators are provided for expanding and controlling the flow of refrigerant through the evaporators. The detailed arrangement shown in FIG. 5 is merely one embodiment that can be used. Given the present teachings as a guide, skilled artisans will appreciate that many other arrangements are also suitable.

Referring to the second loop 104, in some embodiments of the invention, a hot refrigerant defrost solenoid valve 106 is adapted to divert at least some hot refrigerant from compressor 108 to the second evaporator 36. This hot gas flow can be diverted periodically to the second evaporator 36 to melt ice that has built up on the second evaporator. The solenoid 106, for example, can divert hot gas (which otherwise is routed to the second condenser 38) to the second evaporator for a desired period, e.g., a few seconds. After the ice melts, the solenoid 106 closes the path to the second evaporator 36, which then begins cooling back down to capture ice again.

The hot cycle for the second evaporator 36 can optionally be controlled with a flow sensor, a pressure sensor, or both. In one embodiment, if the air flow across the second evaporator 36 has been reduced (e.g., due to ice build-up on the evaporator) to a certain percentage (e.g., 20% or less) of the normal flow level, then in response to a flow sensor registering that such a low flow level has been reached, a valve (e.g., a solenoid valve as described above) can flood the evaporator 36 with hot refrigerant. A pressure sensor can be used in a similar way (but using pressure parameters/readings to initiate the hot cycle), or both flow and pressure sensors can be used. Various timing methods may also be feasible in some cases.

According to a preferred embodiment, the second evaporator 36 is adapted to melt the ice in the manner just described. In other embodiments, though, a heat source external to the second evaporator 36 (a heater, an external flow of warm air, etc.) is used to melt the ice.

Still referring to FIG. 5, in some embodiments of the invention, one or more (e.g., each) of the first evaporator, the first condenser, the second condenser, and the second evaporator may be configured at an oblique angle with respect to the path of air flow 16 (and/or with respect to vertical). For example, in FIG. 5, the first evaporator 32 and the second condenser 38 are angled (e.g., so as to lean) towards the direction of air flow, while the first condenser 34 and the second evaporator 36 are angled (e.g., so as to lean) away from the air flow direction. This, however, is not required.

Figure 6:
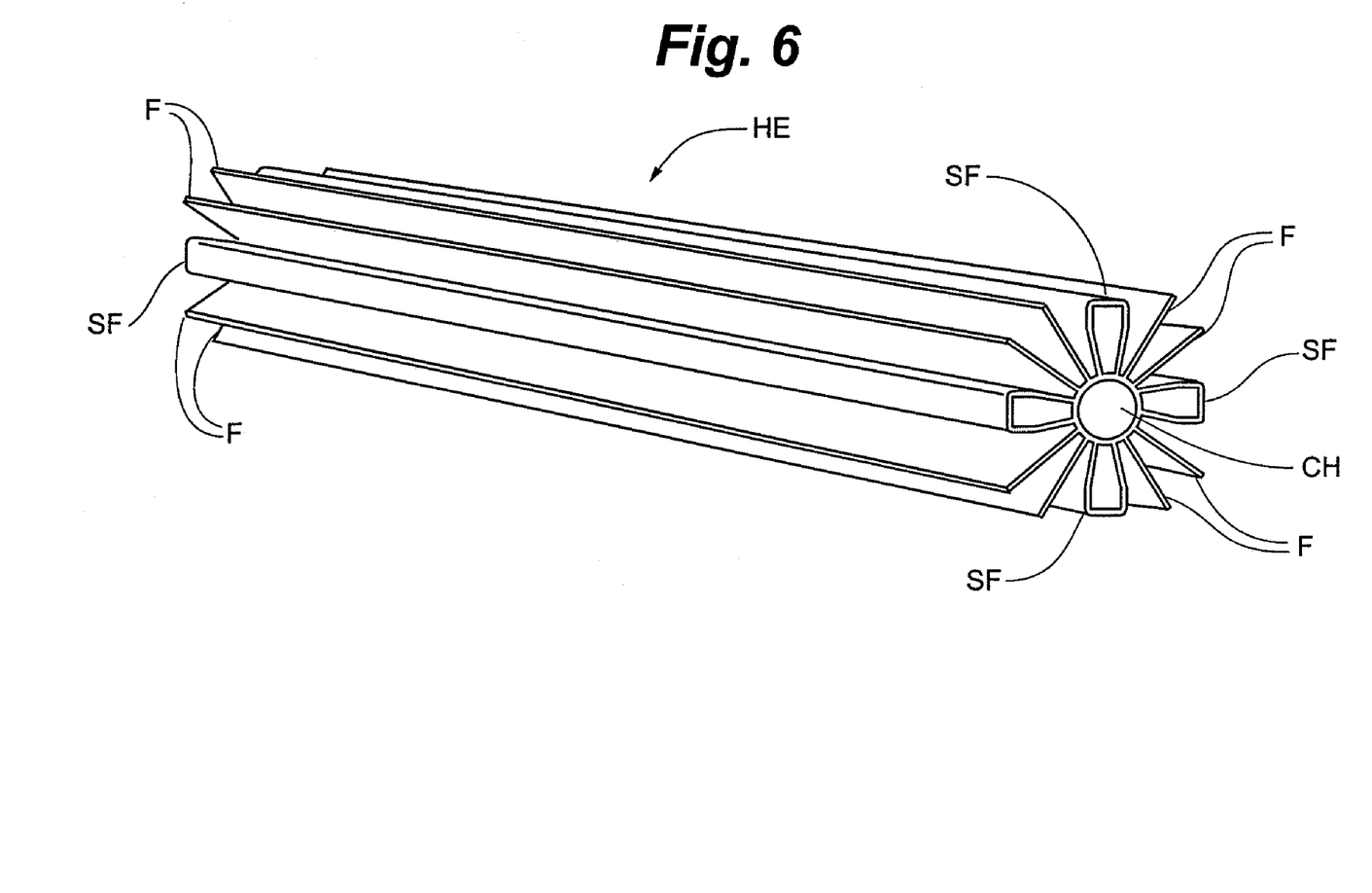
FIG. 6 is a perspective view of a high surface area heat exchanger provided in accordance with certain embodiments of the invention.
Figure 7:
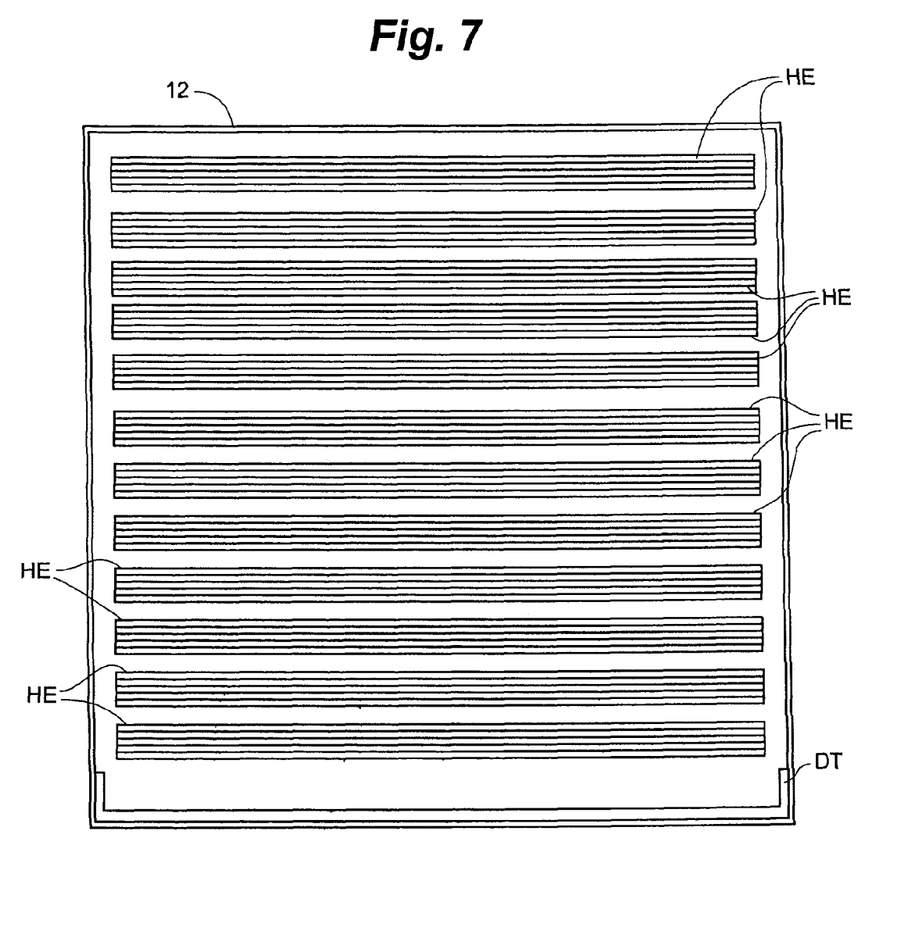
FIG. 7 is a schematic front view of a plurality of high surface area heat exchangers disposed laterally relative to the direction of air flow through a machine in accordance with certain embodiments of the invention.
Figure 8:
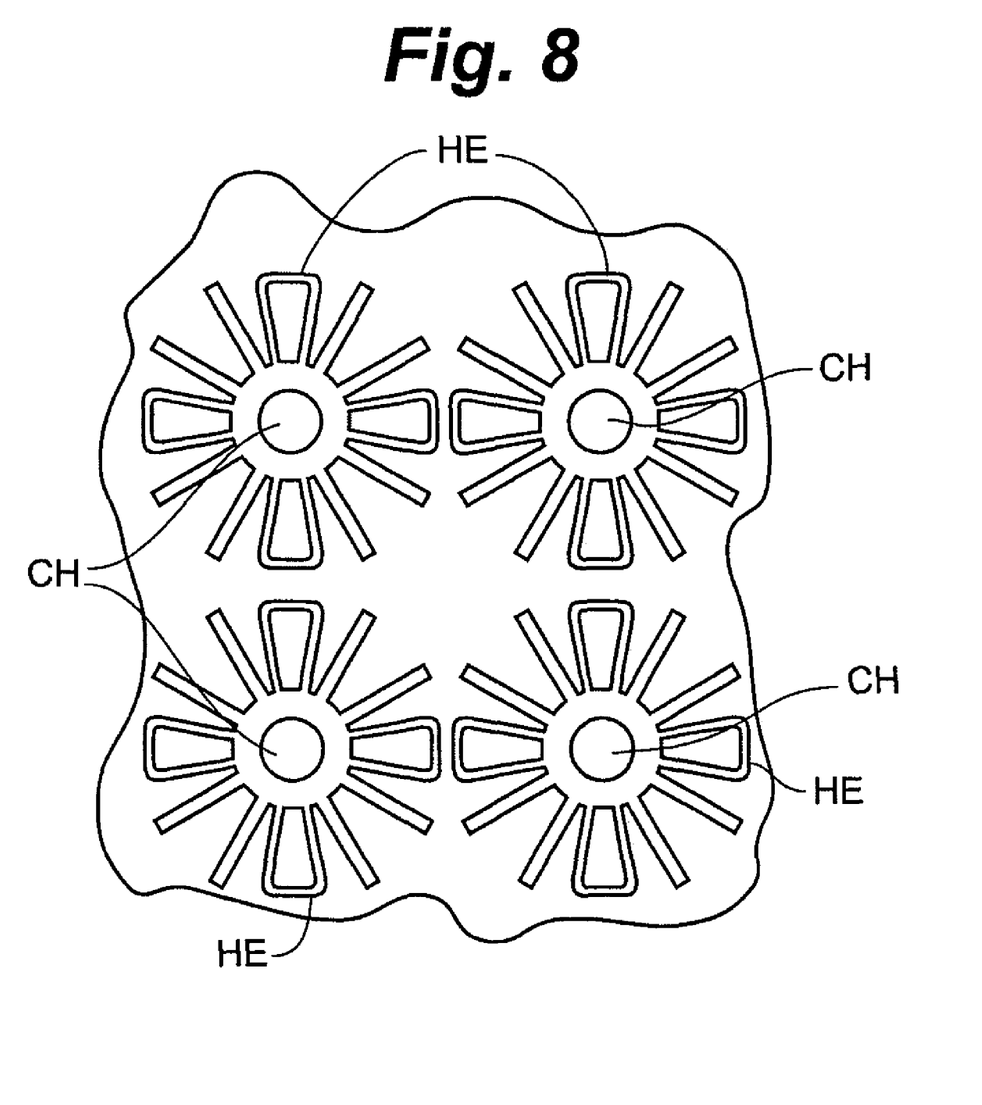
FIG. 8 is a schematic broken-away cross-sectional front view of a plurality of high surface area heat exchangers disposed with their longitudinal axes generally parallel to the direction of air flow through a machine in accordance with other embodiments of the invention.

Turning now to FIGS. 6-8, there is shown a high surface area heat exchanger HE that can optionally be used in the present machine/method. This type of heat exchanger is referred to herein as a bladed core heat exchanger. The bladed core heat exchanger HE has a central conduit (or "core") CH through which refrigerant is adapted to flow. Extending outwardly away from the central conduit CH are a plurality of blades (or "fins") F. The illustrated blades F collectively form a generally star-shaped configuration. In the embodiment of FIG. 6, the heat exchanger HE includes a plurality of (e.g., four) hollow fins CH and a plurality of (e.g., eight) sheet-like monolithic fins. The number of fins, and the number of each type of fins, can be varied to suit different applications. For example, some embodiments provide a bladed core heat exchanger having only monolithic fins. In other embodiments, though, the bladed core includes at least one hollow fin CH. Such fins are advantageous because they can be used to clip together adjacent bladed cores using standard automobile clips or the like. Bladed core heat exchangers HE present great surface area. Therefore, when they are used in the present machine, they make it possible for the machine to extract more water from the air. Bladed core heat exchangers may be particularly desirable for embodiments where the machine admits additional air from outside the machine so as to mix that air with air already flowing along the path 16 inside the machine. Particularly high levels of water extraction are predicted for embodiments having a combination of: i) bladed core heat exchangers, and ii) admission of external air along the path of air flow (described above).

In some cases, the first evaporator 32 (as shown in FIG. 1, 3, 4, or 5) is replaced with a plurality of bladed core evaporators HE disposed laterally relative to the direction of air flow through the machine. Reference is made to FIG. 7. In other cases, bladed core evaporators HE are disposed with their longitudinal axes generally parallel to the direction of air flow through the machine. Reference is made to FIG. 8. Bladed core evaporators can likewise be used (in either arrangement) as the second evaporator 36. Similarly, bladed core condensers can be used (in either arrangement) as the first condenser 34, the second condenser 38, or both.

Some embodiments of the invention provide methods for extracting water from air using machines of the nature described herein. These methods can comprise receiving air from outside the machine and using that air to create an air flow through the machine, e.g., such that the air flows in sequence across a first evaporator, then across a first condenser, and then across a second evaporator. The method preferably includes cooling the air below its dew point as it flows across the first evaporator, and thus condensing liquid water from the air. Preferably, the method then comprises heating the air as it flows across the first condenser, and subsequently cooling the air below the freezing point of water in the air flowing across the second evaporator. Thus, the method preferably comprises forming ice on the second evaporator. Preferably, the method subsequently involves melting that ice to deliver liquid water away from the second evaporator.

Thus, embodiments of the Machines And Methods For Removing Water From Air are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims. The figures merely illustrate exemplary configurations of the machine. The machine, including the housing 12, the air intake 18, and the air outlet 20 can have various configurations depending upon the requirements of a particular embodiment. For example, in alternate embodiments, the machine may be configured to provide a vertical air flow path rather than a horizontal air flow path. Moreover, more than two condensers may be arranged on the air flow path between the first and second evaporators. Still further, one or both evaporators may be replaced with other types of cold structures having surfaces adapted to be maintained at the desired low temperatures. Likewise, one or more condensers may be replaced with other types of hot structures having surfaces adapted to be maintained at the desired high temperatures. Many other variants will be apparent to skilled artisans given the present teaching as a guide.

What is claimed is:

1. A machine for removing water from an airflow, the machine comprising a path of air flow extending from an air intake to an air outlet, the machine being configured such that air flowing along the path passes in sequence across a first evaporator, then across a first condenser, and then across a second evaporator, the first evaporator being located closer to the air intake than is the second evaporator, the machine being adapted to maintain the first evaporator at a desired temperature at or below a dew point of air flowing across the first evaporator, said desired temperature being above a freezing point of water contained in the air flowing across the first evaporator, the first condenser being adapted to heat air flowing away from the first evaporator, the machine being adapted to maintain the second evaporator at a temperature at or below a freezing point of water in air flowing across the second evaporator, the first evaporator being adapted to remove a first amount of water from the air flow by condensing liquid water which is then delivered away from the first evaporator, the second evaporator being adapted to remove a second amount of water from the air flow by capturing ice on the second evaporator, the machine being adapted to subsequently melt said ice such that liquid water is then delivered away from the second evaporator.

2. The machine of claim 1 wherein the path of air flow extends along a single axis of the machine.

3. The machine of claim 1 wherein the first evaporator, the first condenser, and the second evaporator are adapted for simultaneous operation.

4. The machine of claim 1 wherein air flowing from the first evaporator, across the first condenser, and to the second evaporator does not flow across any other evaporator before reaching the second evaporator.

5. The machine of claim 1 wherein air flowing from the first evaporator to the second evaporator flows sequentially across the first condenser and then across a second condenser before reaching the second evaporator.

6. The machine of claim 5 wherein the machine is adapted to perform the ice melt by temporarily diverting through the second evaporator hot refrigerant that normally flows to the second condenser.

7. The machine of claim 6 wherein the machine includes a hot refrigerant defrost solenoid adapted to facilitate said temporary diversion of hot refrigerant.

8. The machine of claim 1 wherein the machine is configured to increase a relative humidity of air flowing between the first evaporator and the second evaporator.

9. The machine of claim 1 wherein the machine is devoid of any water filter.

10. The machine of claim 1 wherein the machine is configured to be portable manually, the machine being equipped with wheels.

11. The machine of claim 1 wherein the machine is adapted to take in additional air and combine it with air flowing away from the first evaporator, the machine being configured such that the additional air enters the machine between the first evaporator and the second evaporator.

12. The machine of claim 11 wherein the machine is configured such that air flowing from the first evaporator to the second evaporator flows sequentially across the first condenser and then across a second condenser before reaching the second evaporator, such that at least some of the additional air enters the machine between the first condenser and the second condenser.

13. The machine of claim 1 wherein the machine has one or more inlets to combine additional air from outside the machine with air flowing between the first evaporator and the second evaporator.

14. The machine of claim 13 wherein the one or more inlets are adapted to be opened and closed selectively.

15. The machine of claim 1 wherein the first condenser is adapted to raise a dew point of air flowing away from the first evaporator.

16. The machine of claim 15 wherein a second condenser between the first condenser and the second evaporator is adapted to further raise the dew point of the air flowing away from the first evaporator.

17. The machine of claim 1 wherein the first amount of water is greater than the second amount of water.

18. The machine of claim 17 wherein the first amount of water constitutes a majority of the water from the air flowing into the machine's air intake.

19. The machine of claim 18 wherein the first amount of water constitutes at least about 70% of the water from the air flowing into the machine's air intake.

20. The machine of claim 1 further comprising a fan configured to move air along the path of air flow.

21. The machine of claim 1 wherein at least one of the first evaporator, the first condenser, and the second evaporator comprises a plurality of bladed core heat exchangers.

22. A method of extracting water from air, the method comprising using a machine through which extends a path of air flow, wherein air flowing along the path moves in sequence across a first evaporator, then across a first condenser, and then across a second evaporator, the method comprising cooling air flowing across the first evaporator to a desired temperature at or below a dew point of the air flowing across the first evaporator to condense liquid water on the first evaporator, heating air flowing across the first condenser, and cooling air flowing across the second evaporator to a temperature at or below a freezing point of water in the air flowing across the second evaporator to form ice on the second evaporator, and melting the ice to deliver liquid water away from the second evaporator.

23. The method of claim 22 wherein the path of air flow extends along a single axis of the machine.

24. The method of claim 23 wherein said axis is a generally horizontal axis.

25. The method of claim 22 wherein the first evaporator, the first condenser, and the second evaporator are operated simultaneously as air flows sequentially past them.

26. The method of claim 22 wherein flowing air across the first evaporator lowers the dew point of that air, and wherein flowing air across the first condenser raises a dew point of that air.

27. The method of claim 26 further comprising flowing air across a second condenser to further heat air flowing toward the second evaporator.

28. The method of claim 27 wherein heating the air flowing across the second condenser further raises a dew point of that air.

29. The method of claim 22 comprising taking additional air from outside the machine and combining the additional air with air flowing away from the first evaporator.

30. The method of claim 29 comprising combining the air flowing away from the first evaporator with the additional air before flowing the resulting combined air flow across the second evaporator.

31. The method of claim 29 comprising combining at least some of the additional air with air flowing away from the first evaporator at a location between the first and second condensers.

32. The method of claim 27 wherein a relative humidity of air flowing between the first and second evaporators increases due to said heating by the first and second condensers.

33. The method of claim 27 wherein said ice melting involves flowing hot refrigerant through the second evaporator.

34. The method of claim 33 wherein the hot refrigerant is flowed through the second evaporator in response to being diverted temporarily from a normal flow route through the second condenser.

35. A machine for removing water from an airflow, the machine comprising a path of air flow extending along a single axis of the machine from an air intake to an air outlet, the machine being configured such that air flowing along the path passes in sequence across a first evaporator, then across a first condenser, then across a second condenser, and then across a second evaporator, the first evaporator being located closer to the air intake than is the second evaporator, the machine being adapted to maintain the first evaporator at a desired temperature at or below a dew point of air flowing across the first evaporator, said desired temperature being above a freezing point of water contained in the air flowing across the first evaporator, the first and second condensers being adapted to heat air flowing away from the first evaporator, the machine being adapted to maintain the second evaporator at a temperature at or below a freezing point of water in air flowing across the second evaporator, the first evaporator being adapted to remove a first amount of water from the air flow by condensing liquid water which is then delivered away from the first evaporator, the second evaporator being adapted to remove a second amount of water from the air flow by capturing ice on the second evaporator, the machine being adapted to subsequently melt said ice such that liquid water is then delivered away from the second evaporator, the machine being devoid of any water filter.

36. The machine of claim 35 wherein the first evaporator, the first condenser, the second condenser, and the second evaporator are adapted for simultaneous operation.

37. The machine of claim 35 wherein air flowing from the first evaporator, across the first and second condensers, and to the second evaporator does not flow across any other evaporator before reaching the second evaporator.

38. The machine of claim 35 wherein the machine is adapted to perform the ice melt by temporarily diverting through the second evaporator hot refrigerant that normally flows to the second condenser.

39. The machine of claim 38 wherein the machine includes a hot refrigerant defrost solenoid adapted to facilitate said temporary diversion of hot refrigerant.

* * * * *